(12) United States Patent
Cho et al.

(10) Patent No.: US 7,162,708 B2
(45) Date of Patent: Jan. 9, 2007

(54) METHOD AND APPARATUS FOR IDENTIFYING SOFTWARE COMPONENTS FOR USE IN AN OBJECT-ORIENTED PROGRAMMING SYSTEM

(75) Inventors: Jin Hee Cho, Daejeon (KR); Jin Sam Kim, Daejeon (KR); Su Jung Ha, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 694 days.

(21) Appl. No.: 10/140,121

(22) Filed: May 8, 2002

(65) Prior Publication Data

US 2003/0126583 A1 Jul. 3, 2003

(30) Foreign Application Priority Data

Dec. 28, 2001 (KR) .............................. 2001-86981

(51) Int. Cl.
*G06F 9/44* (2006.01)

(52) U.S. Cl. .................. 717/104; 717/107; 717/108; 717/116; 717/120

(58) Field of Classification Search ................ 707/100; 705/7, 37; 345/700; 717/104
See application file for complete search history.

(56) References Cited

U.S. PATENT DOCUMENTS

| | | | |
|---|---|---|---|
| 5,920,868 A | | 7/1999 | Fowlow et al. |
| 6,088,739 A | | 7/2000 | Pugh et al. |
| 6,115,719 A | | 9/2000 | Purdy et al. |
| 2003/0214525 A1* | 11/2003 | Esfahany | .................... 345/700 |
| 2004/0210509 A1* | 10/2004 | Eder | ............................. 705/37 |
| 2004/0215495 A1* | 10/2004 | Eder | .............................. 705/7 |
| 2005/0015744 A1* | 1/2005 | Bushey et al. | .............. 717/104 |
| 2005/0060332 A1* | 3/2005 | Bernstein et al. | ........... 707/100 |

FOREIGN PATENT DOCUMENTS

JP 9204300 8/1997

OTHER PUBLICATIONS

Deursen et al., Identifying Objects using Cluster and concept analysis, ICSE 1999.*
Kim, "Java-Based Component-Based Development (CBD)," Dec, 14, 2000.*
Cheesman et al. ("UML Components," Addison-Wesley, chapters 1, 3-5, Oct. 2000).*
Arie van Deursen and Tobias Kuipers, "Identifying Objects using Cluster and Concept Analysis", ICSE '99 Los Angeles CA, pp. 246-255.
Ramachenga R. Valasareddi and Doris L. Carver, Department of Computer Science Louisiana State University, A Graph-Based Object Identification Process for Procedural Programs, 1998 IEEE, pp. 50-58.

(Continued)

*Primary Examiner*—Kakali Chaki
*Assistant Examiner*—Insun Kang
(74) *Attorney, Agent, or Firm*—Mayer, Brown Rowe & Maw LLP

(57) ABSTRACT

In an apparatus for identifying software components having an object and use-case information related to a model domain in a software component developing system, the object and use-case information is inputted in an input section. A UDA table creation section makes use-relation between an object and a use-case transmitted from the input section into a UDA (Use-case Data Access) table. A clustering engine creates at least one identified component by normalizing affinity values between use-relation factors in a UDA table prepared in the UDA table creation section and by performing a clustering only for a value greater than or equal to a threshold among the normalized affinity values.

11 Claims, 5 Drawing Sheets

OTHER PUBLICATIONS

Shingo Takada, Graduate School of Information Science Nara Institute of Science and Technology; Yutaka Otsuka, Graduate School of Information Science Nara Institute of Science and Technology; Kumiyo Nakakoji, Graduate School of Information Science Nara Institute of Science and Technology and Software Engineering Laboratory Software Research Associates, Inc.; and Koji Torii, Graduate School of Information Science Nara Institute of Science and Technology, "Strategies for Seeking Reusable Components in Smalltalk", http://isw3.aist-nara.ac.jp.

* cited by examiner

FIG.4

|     | C1 | C2 | C3 | C4 | C5 | C6 |
|-----|----|----|----|----|----|----|
| U1  | C  | R  | W  |    |    | R  |
| U2  | R  | R  | C  | C  |    |    |
| U3  | R  | C  |    |    |    | C  |
| U4  | R  |    |    | R  | C  |    |
| U5  |    |    |    | R  | D  |    |
| U6  |    |    | R  | R  |    |    |
| U7  | R  | R  |    |    | R  | R  |
| U8  | R  | R  | W  | D  |    |    |

FIG.5

|     | C1 | C2 | C3 | C4 | C5 | C6 |
|-----|----|----|----|----|----|----|
| U1  | C  | R  | W  |    |    | R  |
| U2  | R  | R  | C  | C  |    |    |
| U3  | R  | C  |    |    |    | C  |
| U4  | R  |    |    | R  | C  |    |
| U5  |    |    |    | R  | D  |    |
| U6  |    |    | R  | R  |    |    |
| U7  | R  | R  |    |    | R  | R  |
| U8  | R  | R  | W  | D  |    |    |

|    | C1 | C2 | C3 | C4 | C5 | C6 |
|----|----|----|----|----|----|----|
| U1 | C  | R  | W  |    |    | R  |
| U2 | R  | R  | C  | C  |    |    |
| U3 | R  | C  |    |    |    | C  |
| U4 | R  |    |    | R  | C  |    |
| U8 | R  | R  | W  | D  |    |    |

|    | C1 | C2 | C3 | C4 | C5 | C6 |
|----|----|----|----|----|----|----|
| U1 | 10 | 3  | 5  | 0  | 0  | 3  |
| U2 | 3  | 3  | 10 | 10 | 0  | 0  |
| U3 | 3  | 10 | 0  | 0  | 0  | 10 |
| U4 | 3  | 0  | 0  | 3  | 10 | 0  |
| U8 | 3  | 3  | 5  | 7  | 0  | 0  |

FIG.8

| | C1 | C2 | C3 | C4 | C5 | C6 |
|---|---|---|---|---|---|---|
| U1 | 0.48 | 0.14 | 0.24 | 0 | 0 | 0.14 |
| U2 | 0.12 | 0.12 | 0.38 | 0.38 | 0 | 0 |
| U3 | 0.14 | 0.43 | 0 | 0 | 0 | 0.43 |
| U4 | 0.19 | 0 | 0 | 0.19 | 0.62 | 0 |
| U8 | 0.17 | 0.17 | 0.28 | 0.38 | 0 | 0 |

FIG.9

| C1 | C2 | C3 | C4 | C5 | C6 |
|---|---|---|---|---|---|
| U1 | U3 | U2 | U2 | U4 | U3 |
| | | | U8 | | |

FIG.10

| C1 | C3 | C4 | C2 | C6 | C5 |
|---|---|---|---|---|---|
| U1 | U2 | U2 | U3 | U3 | U4 |
| | | U8 | | | |

A, B, C, D

METHOD AND APPARATUS FOR IDENTIFYING SOFTWARE COMPONENTS FOR USE IN AN OBJECT-ORIENTED PROGRAMMING SYSTEM

FIELD OF THE INVENTION

The present invention relates to a method for identifying reusable components for use in an object-oriented domain modeling of a software component developing system; and, more particularly, to a method and an apparatus for identifying software components for use in an object-oriented programming system by clustering a use-case and an object, which uses affinity between an object obtained from an object-oriented domain modeling process and a use-case extracted from each use-case model.

BACKGROUND OF THE INVENTION

FIG. 1 is a flow chart illustrating a developing process of software components in a conventional software components developing system. Referring to FIG. 1, the developing process of software components in the software component developing system will be described as follows.

First, a domain modeling is performed by using a UML (Unified Modeling Language) technique in order to precisely understand a system of a development object. Through this domain modeling process, a use-case model and an object model are created respectively (step S10 and step S20).

Also, a component, which is highly reusable and separately performable, is identified based on information of the use-case model and the object model (step S30).

Then, a detailed design is made with a description of independency between an interface provided by each component through a component diagram and other components (step S40). That is, a separate development of each component is possible if the interface of the component diagram is maintained. Thus, a binary component code is created through the detailed design and an implementation process of each component in parallel.

The most essential part of a method for a software components development lies in identifying components. In a process of identifying components, parts that are satisfied with reusability, independency and maintenance, which are characteristics of components are selected based on characteristics of a domain where a system belongs to and domain information. However, since there are non-measuring elements in domain information and an evaluation criterion of reusability and independency is not definite, the component identification is mainly relied upon intuition based on experiences of a domain expert.

So far, a technique for identifying components, as a heuristic, makes a group of components by binding highly related objects based on object relation information shown in an object model. In this technique, there are several methods: a method for identifying components on the basis of one operational thread considering a controlling flow shown in a flow chart of a use-case in terms of an operation process design, a method for identifying as one component by binding classes related on a use-case basis, a method for binding identified parts by sub-system in a software architecture level as components.

These methods identify components considering only one specific view among information of several views such as an object view created through a domain modeling process, a process view, and an architecture view. In these methods, there are generated various results depending on people who apply it, since a suggested standard to identify components is obscure. Besides, since a component is identified considering only one view among views such as a relation between objects, a use-case view, and an architecture view, reusability becomes difficult in a developing method of components, wherein the reusability is important in developing method of components.

SUMMARY OF THE INVENTION

It is, therefore, a primary object of the present invention to provide an apparatus for identifying software components in order to overcome above-mentioned problems. This apparatus can identify components that are automatically and systematically reusable by a following process. By using structural information of a system indicated as an object shown in a domain modeling and a use-case model that is functional aspect of a system, use-relation between them is made as a UDA (Use-case Data Access) table. Then affinity of these use-relation factors is calculated and normalized. Then, a clustering process follows.

Another object of the present invention is to provide a method for identifying components for use in an object-oriented programming system. Information obtained from a domain modeling and use-relation between an object and a use-case are made as a UDA table. Then, affinity between these use-relation factors is calculated and normalized. Then, a clustering process follows.

Still another object of the present invention is to provide a recording medium related to a method for identifying components for use in a software component developing system.

In accordance with one aspect of the invention, an apparatus, for identifying software components having object and use-case information related to a model domain in a software component developing system, including:

an input section where the object and use-case information is inputted therein;

a UDA (Use-case Data Access) table creation section where use-relation between an object and the use-case transmitted from the input section is made into a UDA table; and a clustering engine to create at least one identified component by normalizing relative affinity values between use-relation factors in the UDA table prepared in the UDA table creation section and by performing a clustering only for a value greater than or equal to a threshold among the normalized relative affinity values.

In accordance with another aspect of the invention, a method, for identifying software components having object and use-case information related to a model domain for use in an object-oriented programming system, including the steps of:

inputting the object and use-case information;

making use-relation between the inputted object and use-case into a UDA table;

calculating and normalizing relative affinity values between use-relation factors in the UDA table; and creating at least one identified component by performing a clustering only for a value greater than or equal to a threshold among the normalized relative affinity values.

In accordance with still another aspect of the invention, a recording medium having a program in a computer, for identifying software components having object and use-case information related to a model domain in a software component developing system, including the steps of:

inputting the object and use-case information;

making use-relation between the inputted object and use-case into a UDA table;

calculating and normalizing relative affinity values between use-relation factors in the UDA table; and creating at least one identified component by performing a clustering only for a value greater than or equal to a threshold among the normalized relative affinity values.

BRIEF DESCRIPTION OF THE DRAWINGS

The above and other objects and features of the present invention will become apparent from the following description of preferred embodiments, given in conjunction with the accompanying drawings, in which:

FIGS. 4 to 10 depict tables for use in describing an identifying process of software components with respect to a preferred embodiment of the present invention.

BRIEF DESCRIPTION OF THE PREFERRED EMBODIMENTS

Figure 1:
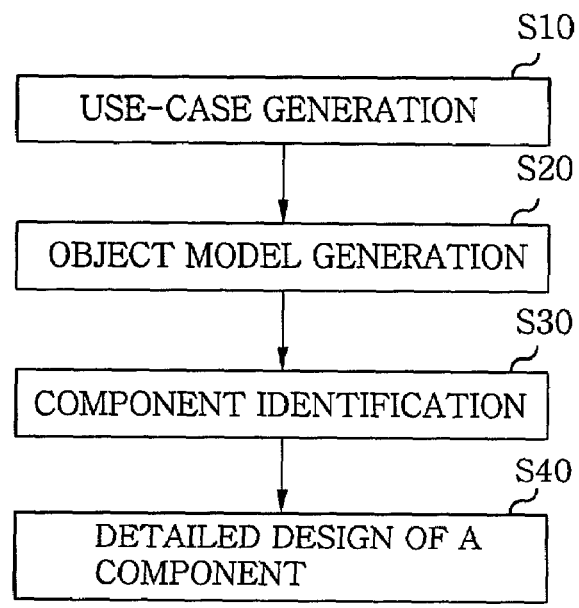
FIG. 1 is a flow chart describing a developing process of software components in a conventional software component developing system.
Figure 2:
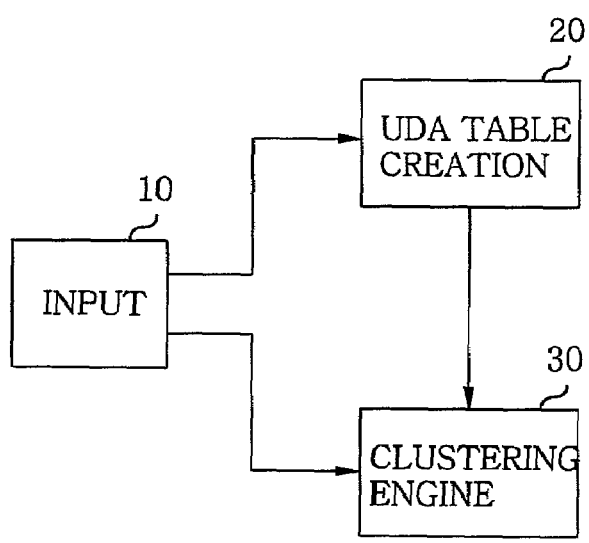
FIG. 2 depicts a diagram of an apparatus for identifying components for use in a software component developing system in accordance with the present invention.

FIG. 2 depicts a diagram of an apparatus for identifying components for use in a software component developing system in accordance with the present invention.

Referring to FIG. 2, the apparatus for identifying components of the present invention is comprised of three things. One is an input section 10 where a user inputs information value of an object and a use-case model, use information and affinity value (weight value) between the object and the use-case and a threshold. Another is a UDA table creation section 20 where use-relation between the object and the use-case is made into a table. The other is a clustering engine 30 to create at least one identified component by performing a clustering, which is only applied to a value greater than or equal to a threshold in a normalized value. Here, affinity of use-relation factors between the object and the use-case is normalized by using the UDA table.

Here, the UDA table creation section 20 controls the UDA table by extracting information of an object and a use-case that are less in use-relation in a prepared UDA table. In a UDA table of the present invention, use-relation factors between the object and the use-case are categorized into create, refer, write, and delete. A create relation means creating a certain object in a certain use-case, and a refer relation means referring, that is to say, reading information of a certain object in a certain use-case. A write relation means writing such as changing information of corresponding object in a certain use-case. A delete relation means deleting (or destroying) a certain object in a certain use-case.

Also, the clustering engine 30 of the present invention performs a clustering by controlling a threshold again when at least one identified component is created greater than or equal to a threshold. The identified component created by a clustering engine is made into a group of interrelated object and use-case.

Therefore, an apparatus for identifying components in accordance with the present invention uses both an object model and a use-case model among object-oriented domain modeling information, and weight value is applied to four types of create, refer, write and delete, which use an object in a use-case. By digitizing this value and clustering based on affinity, at least one identified component is created, which is grouped of interrelated object and use-case.

Figure 3:
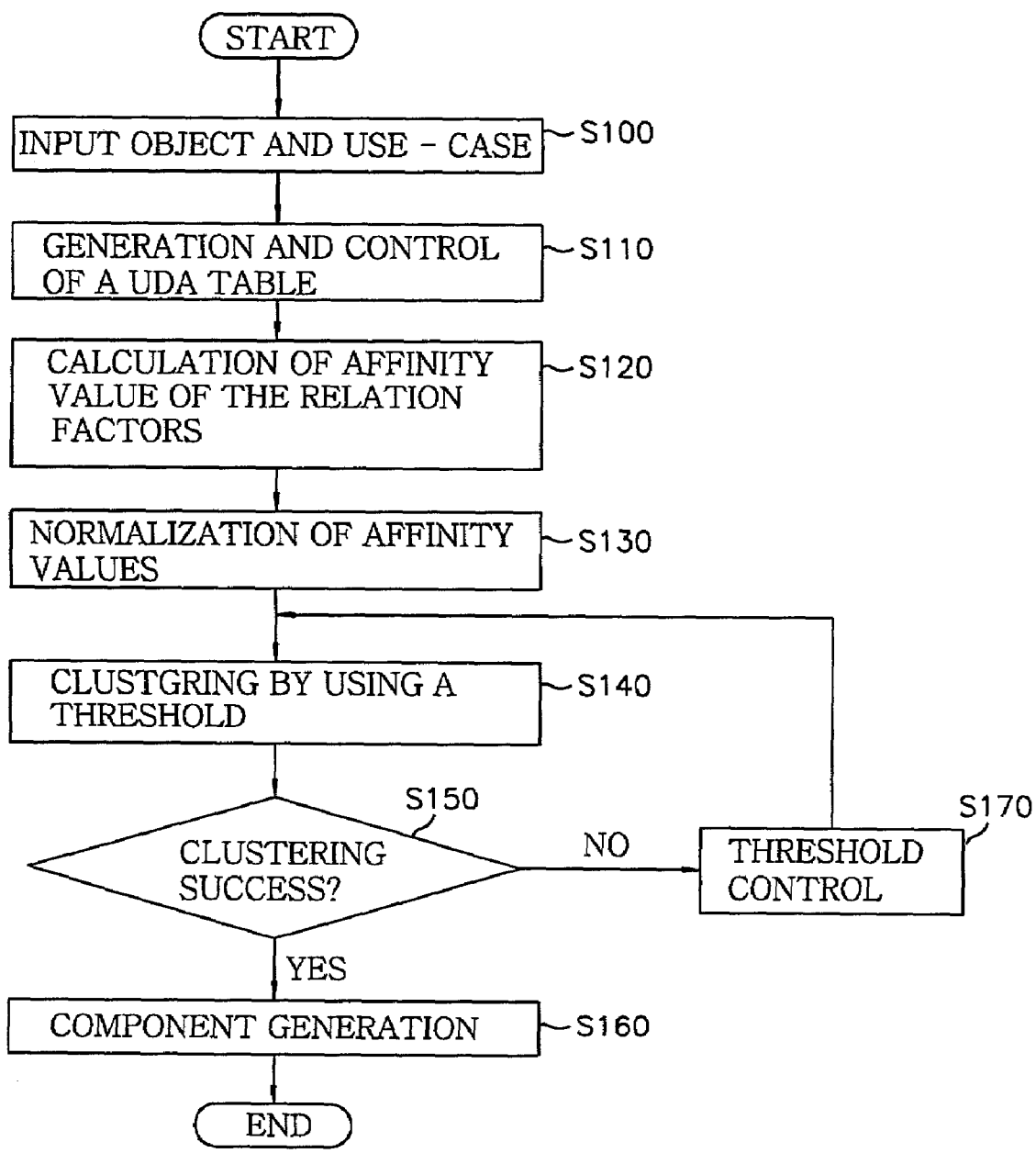
FIG. 3 presents a flow chart of a method for identifying components of the software component developing system in accordance with the present invention.

FIG. 3 presents a flow chart of a method for identifying components for use in an object-oriented programming system in accordance with the present invention. Referring to FIG. 3, an implementation method of an apparatus for identifying components described in FIG. 2 in accordance with the present invention will be described as follows.

First, the input section 10 gets information value of an object and a use-case such as an object name of an object-oriented domain model and a use-case name of a use-case model, use information and affinity value (weight value) between the object and the use-case and a threshold (step S100).

The UDA table creation section 20 makes a UDA table representing use-relation between the object and the use-case based on information of the object and the use-case, which is transmitted from the input section 10. Besides, the UDA table is controlled by extracting information of object and use-case that are less in use-relation in a prepared UDA table (step S110).

In step S110, the use-case or the object that is less in use-relation is extracted in advance from the UDA table for an effective clustering process between the use-case and the object. In this case, a control of the UDA table includes following steps 1) to 3).

1) A use-case, which only refers object data in a UDA table without creating, deleting, and correcting, is extracted as a reference use-case.

2) A use-case, which is commonly used in more than two different use-cases in a use-case model, is extracted as a common use-case. In this case, in the use-case model, a use-case in a relation between <<include>> and <<extend>>, which is a kind of relation between use-cases, is considered. This common use-case is mostly in a relation of create, correct, and delete to object data.

3) An object, which is in a relation of create, correct and delete to the common use-case in the UDA table, is extracted as a common object. In the common object, there are an exclusive common object that object data is created, connected and deleted corresponding to only one use-case, and a non-exclusive common object that object data is created, corrected and deleted corresponding to more than two use-cases. The exclusive one can be considered later after deleting corresponding use-case and object, but the non-exclusive one should be remained in the UDA table.

After removing the use-case and the object that are less in use-relation through these steps, a result illustrated in a table of FIG. 6 is derived.

Also, the UDA table of the UDA creation section 20 is transmitted to the clustering engine 30, and calculates affinity value (weight value) of use-relation factors between the object and the use-case that are included in the UDA table (step S120). Here, relative affinity value between UDA table factors is indicated as A (Ui, Cj).

Then, the clustering engine 30 performs normalization in order to know relative affinity of calculated affinity values in use-relation factors between an object and a use case as on a use-case basis (step S130). Here, a normalized relative affinity value (M (Ui, Cj)) is obtained by employing a following equation (1).

$$M(Ui, Cj) = \frac{A(Ui, Cj)}{\sum_{1 \le k \le m} A(Ui, Ck)} \quad \text{Equation (1)}$$

wherein $$\sum_{1 \le k \le m} A(Ui, Ck)$$

is a sum of value of all objects related as a use-case unit and A (Ui, Cj) is a relative affinity value of a corresponding object and 1≦i≦n, 1≦j≦m.

Also, the clustering engine 30 uses a threshold for clustering only relative affinity greater than or equal to a predetermined threshold. That is, the clustering is performed only for a value which is greater than or equal to the threshold of affinity among normalized values (step S140). Clustering steps of the present invention are as follows.

1) An affinity value that is greater than or equal to a threshold in a UDA table is replaced with a corresponding use-case name, while an affinity value that is less than the threshold is deleted.

2) Use-case names in each row are moved up to a top in order until there is no blank.

3) Columns are moved in order so that same use-case names are adjacent.

Then, the clustering engine 30 determines whether the number of created identified components is greater than or equal to a threshold (step S150). When it is greater than or equal to the threshold, components grouped with interrelated objects and use-cases are identified based on the threshold (step S160). Namely, in accordance with the result of the step S150, an identifying process of components is completed when candidate groups of identified components by clustering are combined not too much or when they are grouped not too much scattered.

However, when the number of identified components is less than the threshold, the threshold is controlled (step S170). Then, by returning to the step S140, a clustering is re-performed by using the controlled threshold. According to the result of the step S150, if identified components are too many or too little by the result of the clustering, it represents that the clustering has not properly performed. In this case, the clustering engine 30 performs a clustering again by raising or lowering the threshold, and checks the result.

Meanwhile, a method for applying a design model of a software component developing system of the present invention as described above is implemented into a program and then can be stored by being recorded in several recording media (CD-ROM, RAM, ROM, floppy disk, hard disk, optical magnetic disk) that are readable by computers.

FIGS. 4 to 10 depict tables for use in describing an identifying process of software components in accordance with a preferred embodiment of the present invention. Referring to these drawings, a process of identifying components in accordance with a preferred embodiment of the present invention will be described.

FIG. 4 shows an example of making a UDA table in the present invention. In the UDA table of the present invention, there are used structural information indicated as an object shown in an object-oriented domain modeling and a use-case model that is a functional aspect of a system. Hereupon, as illustrated in FIG. 4, a relation between the object model as a domain modeling information and the use-case model, i.e., relation information (create, refer, record, delete) using an object on the basis of use-case is made into the UDA table.

In a left column of the UDA table 100, all use-cases of the use-case model are arranged, and in a top row of the table 102, all objects of the object model are arranged. Use-relation information 104 between a use-case and an object is written in a place where a row and a column meet. Here, use-relation information is marked as follows: a create relation as C, a delete relation as D, a record relation as W, and a refer relation as R.

FIG. 5 is an example of a controlled UDA table in accordance with the present invention, and a part that is less in use-relation is controlled for an effective clustering with a UDA table depicting use-relation between a use-case and an object. This control is done by referring to a use-case model, and the use-case model thereof is omitted.

The following use-case model is assumed for a detailed description of an identifying process of components, which is suggested by the present invention. Use-cases U6 and U7 denoted by 110 in FIG. 5, which are use-cases only to refer, are deleted in FIG. 6 illustrating a controlled UDA table. If a use-case U5 (108) is supposed to be a common use-case, an object C5 (106), which is created or deleted in the common use-case U5 (108), is a base object. In FIG. 5, the object C5 (106) is a non-exclusive base object since it has a create relation with a use-case U4. If this object C5 (106) is not created or deleted in another use-case, it becomes an exclusive base object. The non-exclusive base object remains even after a control of a UDA table. The controlled result (112) is illustrated in FIG. 6.

FIG. 7 is a result of applying affinity in accordance with use-relation of a use-case and an object in a UDA table of the present invention.

In the UDA table as in FIG. 7, affinity value (weight value) is applied to use-relation between each use-case and object. Here, affinity value (weight value) records about the rest except a refer use-case, a common use-case and an exclusive use-case in the UDA table. A degree of relative affinity value (weight value) in a relation of C, D, W and R, which fill the UDA table, is defined numerically, so that they can be compared. Since this is not a fixed value and can be different depending on characteristics of systems, this can be defined by a user.

For example, C is defined as 10 because it has a highest affinity, and D is given 7 since it has a second highest affinity. In this way, W is given 5, and R is given 3 depending on the degree of affinity. Here, C, D, W and R, which fill the UDA table, are changed into defined affinity value (weight value) as C, which is indicated in the middle of a use-case U1 and an object C1 in the UDA table, is changed into '10' (114). All parts where C, D, W and R are not indicated are changed into '0'.

FIG. 8 is an example of a normalization of affinity between a use-case and an object in a UDA table of the present invention. Normalization value (M (Ui, Cj)) (normalized relative affinity value) is obtained in order to estimate relative affinity values with objects related on a use-case basis for the UDA table of FIG. 7. The normalization value is obtained by employing the equation $$M(Ui, Cj) = \frac{A(Ui, Cj)}{\sum_{1 \le k \le m} A(Ui, Ck)}, (1 \le i \le n, 1 \le j \le m). \quad (1)$$

This normalization value (M (Ui, Cj)) describes a largeness or smallness of relative affinity of a corresponding object on a use-case basis in the UDA table. For instance, in a UDA table of FIG. 8, relative affinity value for the use-case U1 and the object C1 is 0.48 (116). In this case, for example, if a threshold of affinity for a clustering is 0.35, parts that have relative affinity value greater than or equal to the threshold are indicated as hatched marks.

FIGS. 8 and 9 show an example of a UDA clustering process of the present invention. The clustering of the present invention replaces parts having affinity value (116) greater than or equal to the threshold hatched in FIG. 8 with corresponding use-case names (U1, U2, U3).

For example, in FIG. 8, affinity value of the U1 and the C1 is 0.48 (116), which is over 0.35 of a threshold. Therefore, affinity value of 0.48 is replaced with the U1. Also, when affinity value is smaller than 0.35 of the threshold, use-cases are moved to a top by repeating deletion processes. Then, a top row of a UDA table indicates object names (C1, C2, C3, etc.), and a next row & its next row of the table indicate use-cases (U1, U2, U3, etc.). That is to say, the use-case U3 (122) is below the object C2 (118), and the use-case U3 (124) is redundantly shown below an object C6 (120).

In a UDA table illustrated in FIG. 9, objects having same use-cases based on a use-case are collected in order. For instance, C3 and C4 are collected for U2, and C2 and C6 are collected for U3. Then, grouped four objects of A (C1, U1), B (C3, C4, U2, U8), C (C2, C6, U3), D (C5, U4) and an identifying component 126, which is grouped of use-cases, are created as in FIG. 10. Here, FIG. 10 shows an example of an identified component in accordance with the present invention.

As described above, the present invention uses structural information of a system indicated as an object shown in a domain modeling and a use-case model that is a functional aspect of a system. A use-relation between an object and a use-case is made into a UDA (Use-case Data Access) table, and then affinity of these use-relation factors is calculated and normalized. Thereafter, reusable components can be identified.

Therefore, the present invention solves a problem of reusability, which occurs when components are identified considering only a relation of objects or only a use-case depending on intuition and experiences of a user.

While the invention has been shown and described with respect to the preferred embodiments, it will be understood by those skilled in the art that various changes and modifications may be made without departing from the spirit and scope of the invention as defined in the following claims.

What is claimed is:

1. An apparatus, for identifying software components having object and use-case information related to a model domain in a software component developing system, comprising:

an input section where the object and the use-case information is inputted therein;

a UDA (Use-case Data Access) table creation section where a use-relation between the object and the use-case information transmitted from the input section is made into a UDA table; and a clustering engine to create at least one identified component by calculating and normalizing relative affinity values between use-relation factors categorized into create, refer, write, and delete in the UDA table prepared in the UDA table creation section and by performing a clustering only for an affinity value greater than or equal to a threshold among the normalized relative affinity values.

2. The apparatus of claim 1, wherein the UDA table creation section controls the UDA table by extracting information of the object and the use-case information that are less than the threshold in use-relation in the prepared UDA table.

3. The apparatus of claim 1, wherein the clustering engine calculates and normalizes the relative affinity values between the use-relation factors of the UDA table, performs a clustering only for a value greater than or equal to a threshold among the normalized relative affinity values, and generates at least one identified component by grouping interrelated object and use-cases.

4. The apparatus of claim 1, wherein the clustering engine performs a clustering by controlling the threshold again when the number of identified components is greater than or equal to the threshold.

5. The apparatus of claim 3, wherein each of the normalized relative affinity values is obtained by employing a following equation:

$$M(Ui, Cj) = \frac{A(Ui, Cj)}{\sum_{1 \le k \le m} A(Ui, Ck)},$$

wherein, $1 \le i \le n$, $1 \le j \le m$, and A (Ui, Cj) indicates a relative affinity value between the use-relation factors in the UDA table.

6. Computer-implemented method for identifying software components having object and use-case information related to a model domain for use in an object-oriented programming system, comprising the steps of:

inputting the object and the use-case information;

making a use-relation between the inputted object and the use-case information into a UDA (Use-case Data Access) table;

calculating and normalizing relative affinity values between use-relation factors categorized into create, refer, write and delete in the UDA table; and creating at least one identified component by performing a clustering only for an affinity value greater than or equal to a threshold among the normalized relative affinity values.

7. The method of claim 6, further comprising the step of controlling the UDA table by extracting information of the object and the use-case information that are less than the threshold in use-relation in the UDA table, after making the UDA table.

8. The method of claim 6, wherein said at least one identified component created by the clustering is grouped of interrelated object and use-case.

9. The method of claim 6, wherein each of the normalized affinity values is obtained by employing a following equation:

$$M(Ui, Cj) = \frac{A(Ui, Cj)}{\sum_{1 \leq k \leq m} A(Ui, Ck)}$$

($1 \leq i \leq n$, $1 \leq j \leq m$), wherein A (Ui, Cj) indicates a relative affinity value between the use-relation factors in a UDA table.

10. The method of claim 6, further comprising the step of performing a clustering by controlling the threshold again when the number of identified components is greater than or equal to a threshold.

11. A recording medium having a program in a computer, for identifying software components having object and use-case information related to a model domain in a software component developing system, comprising the steps of:

inputting the object and the use-case information;

making a use-relation between the inputted object and the use-case information into a UDA (Use-case Data Access) table;

calculating and normalizing relative affinity values between use-relation factors categorized into create, refer, write, and delete in the UDA table; and creating at least one identified component by performing a clustering only for an affinity value greater than or equal to a threshold among the normalized relative affinity values.

* * * * *